US012728949B2

(12) United States Patent
Shahana

(10) Patent No.: US 12,728,949 B2
(45) Date of Patent: Sep. 8, 2026

(54) CONTROL DEVICE FOR HUMAN-POWERED VEHICLE AND OPERATION SYSTEM FOR HUMAN-POWERED VEHICLE

(71) Applicant: Shimano Inc., Sakai (JP)

(72) Inventor: Satoshi Shahana, Sakai (JP)

(73) Assignee: Shimano Inc., Osaka (JP)

( * ) Notice: Subject to any disclaimer, the term of this patent is extended or adjusted under 35 U.S.C. 154(b) by 1298 days.

(21) Appl. No.: 17/188,425

(22) Filed: Mar. 1, 2021

(65) Prior Publication Data

US 2021/0284279 A1 Sep. 16, 2021

(30) Foreign Application Priority Data

Mar. 12, 2020 (JP) ................................ 2020-043136

(51) Int. Cl.
*B62M 6/50* (2010.01)
*B62J 45/412* (2020.01)
(Continued)

(52) U.S. Cl.
CPC .............. *B62M 6/50* (2013.01); *B62J 45/412* (2020.02); *B62J 45/413* (2020.02); *B62M 6/55* (2013.01)

(58) Field of Classification Search
CPC . B62M 6/50; B62M 6/55; B62M 6/45; B62M 25/08; B62M 6/90; B62M 9/122; B62M 9/132; B62M 6/65; B62M 2025/003; B62M 6/60; B62M 9/12; B62M 6/40; B62M 2025/006; B62M 15/00; B62M 25/04; B62M 3/08; B62M 7/00; B62M 7/12; B62M 6/70; B62M 1/36; B62M 23/02; B62M 3/00; B62M 6/20;
(Continued)

(56) References Cited

U.S. PATENT DOCUMENTS 3,929,025 A * 12/1975 Perry .................... B62M 9/123
474/81
5,226,501 A 7/1993 Takata
(Continued)

FOREIGN PATENT DOCUMENTS

JP 4-358988 A 12/1992
JP 2012-144061 A 8/2012
(Continued)

*Primary Examiner* — Rachid Bendidi
*Assistant Examiner* — Irene C Khuu
(74) *Attorney, Agent, or Firm* — Spencer Fane, LLP

(57) ABSTRACT

A human-powered vehicle control device is provided for a human-powered vehicle. The human-powered vehicle control device comprises a controller that controls a motor to apply a propulsion force to the human-powered vehicle. The controller is configured to control the motor in at least one of a first control state, in which the controller controls the motor in accordance with human driving force input to an input rotary body of the human-powered vehicle and which includes a plurality of assist stages switchable by an operation unit differing from input rotary body, and a second control state, in which the controller controls the motor in accordance with operation of the operation unit. In a case where human driving force is input to the input rotary body in the second control state, the controller is configured to control the motor in the first control state.

11 Claims, 5 Drawing Sheets

(51) Int. Cl.
*B62J 45/413* (2020.01)
*B62M 6/55* (2010.01)

(58) Field of Classification Search
CPC ........ B62M 25/02; B62M 6/75; B62M 9/121; B62M 9/123; B62M 9/1242; B62M 9/133; B62M 9/1342; B62M 9/135; B62J 45/412; B62J 45/413; B60L 2200/12; B60L 50/20; B60L 2250/16; B60L 2240/12; B60L 15/20; B60L 15/2009; B60L 2240/547; B60L 2240/36; B60L 2240/429; B60L 2240/549; B60L 2240/642; B60L 2250/12; B60L 50/52; B60L 50/53; B60L 7/12; B60L 58/12; B60L 58/25; B60L 1/08; B60L 1/12; B60L 15/2063; B60L 15/2072; B60L 15/30; B60L 2220/16; B60L 2220/44; B60L 2220/46; B60L 2240/14; B60L 2240/421; B60L 2240/423; B60L 2240/427; B60L 2240/441; B60L 2240/545; B60L 2240/80; B60L 2250/22; B60L 2250/24; B60L 2250/26; B60L 50/00; B60L 50/51; B60L 50/64; B60L 50/66; B60L 7/10; B60L 7/26; B60L 58/13; B60L 7/18; B62K 23/02; B62K 23/06; B62K 23/00; B62K 11/00; B62K 19/36; B62K 11/04; B62K 25/08; B62K 25/286; B62K 15/008; B62K 2025/045; B62K 2025/047; B62K 21/12; B62K 2202/00; B62K 25/04; B62K 15/00; B62K 19/40; B62K 2015/003; B62K 2025/048; B62K 21/26; B62K 2204/00; B62K 25/005; B62K 25/28; B62K 19/00; B62K 21/16; B62K 23/04; B62K 25/00; B62K 25/30; B62K 3/00; B62K 3/02
See application file for complete search history.

(56) References Cited

U.S. PATENT DOCUMENTS

| | | | | |
|---|---|---|---|---|
| 2015/0120119 | A1* | 4/2015 | Tauchi | B62M 15/00<br>701/22 |
| 2015/0367750 | A1* | 12/2015 | Takamoto | B62K 11/00<br>701/22 |
| 2016/0297499 | A1* | 10/2016 | Ohashi | B60K 35/00 |
| 2016/0318583 | A1* | 11/2016 | Watarai | B62M 25/08 |
| 2017/0151998 | A1* | 6/2017 | Negoro | B62M 6/55 |
| 2017/0355420 | A1* | 12/2017 | Tsuchizawa | B62M 6/50 |
| 2018/0118305 | A1* | 5/2018 | Tsuchizawa | B62M 25/08 |
| 2018/0257743 | A1* | 9/2018 | Tsuchizawa | B62J 45/415 |
| 2018/0362115 | A1* | 12/2018 | Tsuchizawa | B62M 6/50 |
| 2019/0300106 | A1* | 10/2019 | Terashima | B62M 6/70 |

FOREIGN PATENT DOCUMENTS

| | | | | | |
|---|---|---|---|---|---|
| JP | 2016-199084 | A | | 12/2016 | |
| JP | 2016-203813 | A | | 12/2016 | |
| JP | 2021142895 | A | * | 9/2021 | B62M 6/50 |

* cited by examiner

CONTROL DEVICE FOR HUMAN-POWERED VEHICLE AND OPERATION SYSTEM FOR HUMAN-POWERED VEHICLE

CROSS-REFERENCE TO RELATED APPLICATIONS

This application claims priority to Japanese Patent Application No. 2020-043136, filed on Mar. 12, 2020. The entire disclosure of Japanese Patent Application No. 2020-043136 is hereby incorporated herein by reference.

BACKGROUND

Technical Field

The present disclosure generally relates to a human-powered vehicle control device for a human-powered vehicle and a human-powered vehicle operation system for a human-powered vehicle.

Background Information

Japanese Laid-Open Patent Publication No. 2012-144061 (Patent Document 1) discloses an example of control device for a human-powered vehicle. The control device includes a crank arm to which depression force is applied and a motor configured to apply a propulsion force to the human-powered vehicle. The control device is configured to control the motor in accordance with the depression force input to the crank arm or control the motor in accordance with operation of an operation unit.

SUMMARY

In Patent Document 1, an operation unit is operated to switch between a control state, in which the motor is controlled in accordance with depression force input to an input rotary body, and a control state, in which the motor is controlled in accordance with operation of the operation unit.

One object of the present disclosure is to provide a human-powered vehicle control device for a human-powered vehicle and a human-powered vehicle operation system for a human-powered vehicle that reduce the number of steps performed by the rider.

A human-powered vehicle control device in accordance with a first aspect of the present disclosure is for a human-powered vehicle. The human-powered vehicle control device comprises a controller configured to control a motor to apply a propulsion force to the human-powered vehicle. The controller is configured to control the motor in at least one of a first control state, in which the controller controls the motor in accordance with human driving force input to an input rotary body of the human-powered vehicle and which includes a plurality of assist stages switchable by an operation unit differing from the input rotary body, and a second control state, in which the controller controls the motor in accordance with operation of the operation unit. In a case where human driving force is input to the input rotation body in the second control state, the controller is configured to control the motor in the first control state. With the human-powered vehicle control device in accordance with the first aspect, the human-powered vehicle control device shifts to the first control state in a case where a human driving force is input to the input rotary body while in the second control state. This reduces the number of steps performed by the rider.

In accordance with a second aspect of the present disclosure, the human-powered vehicle control device according to the first aspect is configured so that the second control state includes a control state in which the motor applies the propulsion force to the human-powered vehicle regardless of the human driving force input to the input rotary body. With the human-powered vehicle control device in accordance with the second aspect, the motor can apply a propulsion force to the human-powered vehicle regardless of the human driving force input to the input rotary body in the second control state.

In accordance with a third aspect of the present disclosure, the human-powered vehicle control device according to the first or second aspect is configured so that the controller is configured to switch from the second control state to the first control state in a case where a traveling speed of the human-powered vehicle becomes higher than or equal to a predetermined traveling speed that is determined in advance. With the human-powered vehicle control device in accordance with the third aspect, the human-powered vehicle control device switches from the second control state to the first control state in a case where a traveling speed of the human-powered vehicle becomes higher than or equal to the predetermined traveling speed that is determined in advance. This reduces the number of steps performed by the rider.

In accordance with a fourth aspect of the present disclosure, the human-powered vehicle control device according to any one of the first to third aspects is configured so that the controller is configured to switch from the second control state to the first control state in a case where the input rotary body is rotated. With the human-powered vehicle control device in accordance with the fourth aspect, the human-powered vehicle control device shifts to the first control state in a case where the input rotary body is rotated while in the second control state. This reduces the number of steps performed by the rider.

In accordance with a fifth aspect of the present disclosure, the human-powered vehicle control device according to any one of the first to fourth aspects is configured so that the controller is configured to perform switching of a first motor control mode, a second motor control mode, and a third motor control mode in the first control state in accordance with operation of the operation unit. With the human-powered vehicle control device in accordance with the fifth aspect of the present disclosure, the human-powered vehicle control device can switch to any of the first motor control mode, the second motor control mode, and the third motor control mode in the first control state in accordance with the operation of the operation unit.

In accordance with a sixth aspect of the present disclosure, the human-powered vehicle control device according to the fifth aspect is configured so that the controller is configured to perform switching of the first control state and the second control state in accordance with operation of the operation unit. With the human-powered vehicle control device in accordance with the sixth aspect of the present disclosure, the human-powered vehicle control device can switch to any of the first control state and the second control state in accordance with the operation of the operation unit.

In accordance with a seventh aspect of the present disclosure, the human-powered vehicle control device according to the fifth or sixth aspect is configured so that the first control state includes a fourth motor control mode that stops the motor, and the controller is configured to perform from the first control state to the second control state in accordance with the operation of the operation unit while in the fourth control mode. With the human-powered vehicle control device in accordance with the seventh aspect, the fourth control mode that stops the motor is performed if the first control state is switched to the second control state in accordance with the operation of the operation unit. This reduces battery consumption.

A human-powered vehicle control device in accordance with an eight aspect of the present disclosure is for a human-powered vehicle. The human-powered vehicle control device comprises a controller is configured to control a motor to apply a propulsion force to the human-powered vehicle. The controller is configured to control the motor in at least one of a first control state, in which the controller controls the motor in accordance with human driving force input to an input rotary body of the human-powered vehicle, and a second control state, in which the controller controls the motor in accordance with operation of an operation unit differing from the input rotary body regardless of the human driving force input to the input rotary body. In a case where a traveling speed of the human-powered vehicle becomes higher than or equal to a predetermined traveling speed in the second control state, the controller is configured to control the motor in the first control state. With the human-powered vehicle control device in accordance with the eighth aspect, the human-powered vehicle control device shifts to the first control state in a case where the traveling speed of the human-powered vehicle becomes higher than or equal to the predetermined traveling speed in the second control state. This reduces the number of steps performed by the rider.

In accordance with a ninth aspect of the present disclosure, the human-powered vehicle control device according to the eighth aspect is configured so that the human-powered vehicle control device further comprises a sensor configured to detect information related to a traveling state of the human-powered vehicle. The controller is configured to control the motor in accordance with a detection result of the sensor. With the human-powered vehicle control device in accordance with the ninth aspect, the human-powered vehicle control device shifts to the first control state in a case where the traveling speed of the human-powered vehicle becomes higher than or equal to the predetermined traveling speed in the second control state. This reduces the number of steps performed by the rider.

In accordance with a tenth aspect of the present disclosure, the human-powered vehicle control device according to the ninth aspect is configured so that the sensor includes at least one of a vehicle speed sensor configured to detect information related to a rotational speed of a wheel of the human-powered vehicle, a position information detection sensor configured to detect information related to a position of the human-powered vehicle, and an acceleration sensor configured to detect information related to acceleration of the human-powered vehicle. With the human-powered vehicle control device in accordance with the tenth aspect, the human-powered vehicle control device shifts to the first control state in a case where the traveling speed of the human-powered vehicle becomes higher than or equal to the predetermined traveling speed in the second control state. This reduces the number of steps performed by the rider.

A human-powered vehicle control device in accordance with an eleventh aspect of the present disclosure is for a human-powered vehicle. The human-powered vehicle control device comprises a controller is configured to control a motor to apply a propulsion force to the human-powered vehicle. The controller is configured to control the motor in at least one of a first control state, in which the controller controls the motor in accordance with human driving force input to an input rotary body of the human-powered vehicle, and a second control state, in which the controller controls the motor in accordance with operation of an operation unit differing from the input rotary body regardless of the human driving force input to the input rotary body. In a case where a predetermined condition is satisfied in the first control state, the controller is configured to control the motor in the second control state. The predetermined condition includes at least one of a case where a still state in which the human-powered vehicle is still continues over a first predetermined period, a case where a traveling speed of the human-powered vehicle is lower than or equal to a predetermined speed, a case where a second predetermined period elapses from a time point at which the human driving force of a predetermined value or greater is detected in a state in which the human-powered vehicle is traveling at the predetermined speed or lower, a case where a pitch angle of the human-powered vehicle is greater than or equal to a predetermined pitch angle, a case where the human driving force input to the input rotary body of the human-powered vehicle is greater than or equal to the predetermined value, and a case where at least one of the pitch angle of the human-powered vehicle being greater than or equal to the predetermined pitch angle and the human driving force input to the input rotary body of the human-powered vehicle being less than or equal to the predetermined value is satisfied in a state in which the human-powered vehicle is traveling at the predetermined speed or lower. With the human-powered vehicle control device in accordance with the eleventh aspect, the motor is controlled in the second control state in a case where the predetermined condition is satisfied in the first control state. This allows the motor to be easily used. With the human-powered vehicle control device in accordance with the tenth aspect, the human-powered vehicle control device shifts to the second control state in a case where the human-powered vehicle satisfies the predetermined condition. This reduces the number of steps performed by the rider.

In accordance with a twelfth aspect of the present disclosure, the human-powered vehicle control device according to the eleventh aspect is configured so that the predetermined condition further includes a case where a rotational speed of the input rotary body is inconstant. With the human-powered vehicle control device in accordance with the twelfth aspect, the human-powered vehicle control device shifts to the second control state in a case where the rotational speed of the input rotary body is fluctuating in the first control state.

In accordance with a thirteenth aspect of the present disclosure, the human-powered vehicle control device according to the eleventh or twelfth aspect is configured so that the human-powered vehicle control device comprises at least one of a vehicle speed sensor configured to detect information related to a rotational speed of a wheel of the human-powered vehicle and a crank rotation sensor configured to detect information related to a rotational speed of a crank. The controller is configured to obtain the traveling speed from an output of the vehicle speed sensor and obtains the rotational speed of the crank from an output of the crank rotation sensor. With the human-powered vehicle control device in accordance with the thirteenth aspect, the human-powered vehicle control device shifts from the first control state to the second control state by obtaining at least one of the traveling speed corresponding to the output of the vehicle speed sensor and the crank rotational speed corresponding to the output of the crank rotation sensor.

In accordance with a fourteenth aspect of the present disclosure, the human-powered vehicle control device according to any one of the first to thirteenth aspects is configured so that the controller is configured not to drive the motor during a period in which the operation unit is not operated in the second control state, and the controller is configured to drive the motor during a period in which the operation unit is continuously operated in the second control state. With the human-powered vehicle control device in accordance with the fourteenth aspect, the rider can drive the motor in any manner in the second control state.

A human-powered vehicle operation system in accordance with a fifteenth aspect of the present disclosure is for a human-powered vehicle. The human-powered vehicle operation system comprises the human-powered vehicle control device according to any one of the first to fourteenth aspects and the operation unit. With the human-powered vehicle operation system in accordance with the fifteenth aspect, the operation system can shift between the first control state and the second control state if the predetermined condition is satisfied.

The human-powered vehicle control device for a human-powered vehicle and the human-powered vehicle operation system for a human-powered vehicle in accordance with the present disclosure allow for the motor to be easily used.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

Figure 1:
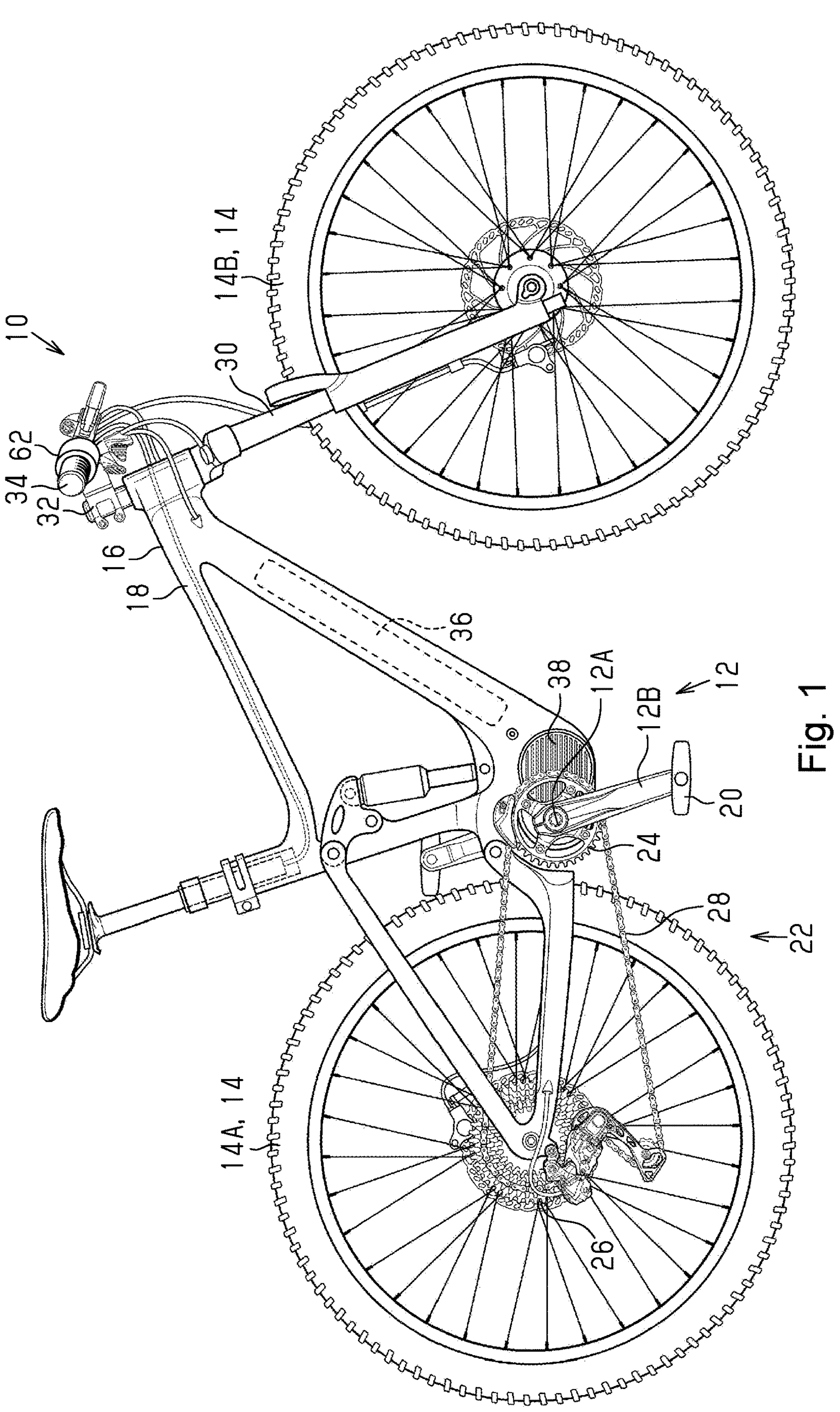
FIG. 1 is a side elevational view of a human-powered vehicle (e.g. a bicycle) including a human-powered vehicle control device and a human-powered vehicle operation system in accordance with a first embodiment.
Figure 2:
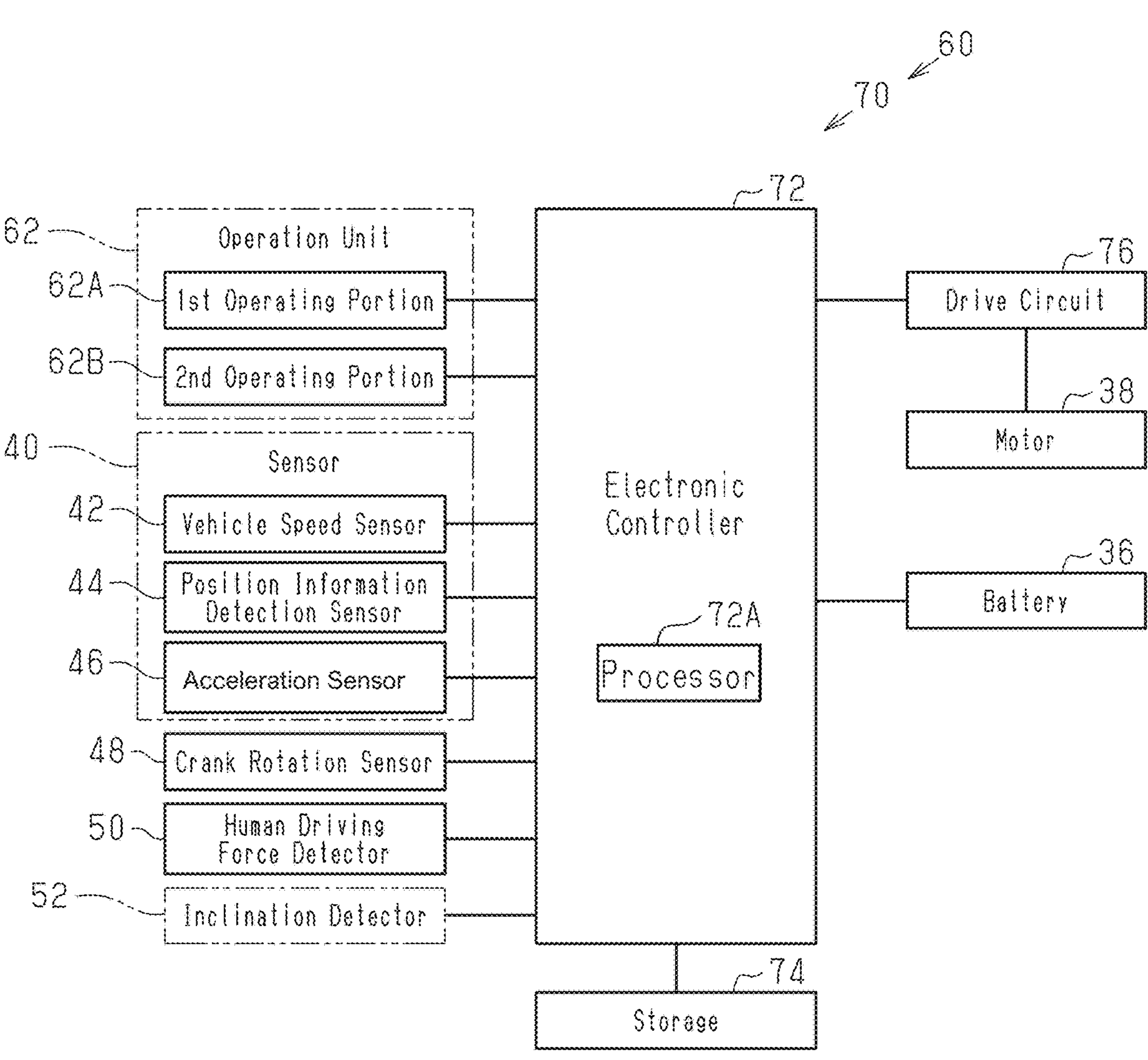
FIG. 2 is a block diagram showing the electrical configuration of the human-powered vehicle control device and the human-powered vehicle operation system.

A human-powered vehicle control device 70 for a human-powered vehicle and a human-powered vehicle operation system 60 for a human-powered vehicle in accordance with a first embodiment will now be described with reference to FIGS. 1 to 3. A human-powered vehicle 10 is a vehicle that includes at least one wheel, and is driven by at least human driving force H. The human-powered vehicle 10 includes, for example, various types of bicycles such as a mountain bike, a road bike, a city bike, a cargo bike, a handcycle, and a recumbent bike. The number of wheels of the human-powered vehicle 10 is not limited. The human-powered vehicle 10 can be, for example, a boat or the like that does not include wheels. The human-powered vehicle 10 includes, for example, a monocycle and vehicles having three or more wheels. The human-powered vehicle 10 is not limited to a vehicle driven only by human driving force H. The human-powered vehicle 10 includes an e-bike that uses not only human driving force H but also drive force of an electric motor for propulsion. An e-bike includes an electric assist bicycle that assists in propulsion of the vehicle with an electric motor. In the embodiments described below, the human-powered vehicle 10 refers to a bicycle.

The human-powered vehicle 10 includes a crank 12 to which human driving force H is input. The human-powered vehicle 10 further includes a pair of wheels 14 and a body 16. The wheels 14 include a rear wheel 14A and a front wheel 14B. The body 16 includes a frame 18. The crank 12 includes an input rotation shaft 12A, which is rotatable relative to the frame 18, and two crank arms 12B, which are respectively provided on the axial ends of the input rotation shaft 12A. The input rotary body 12A is a crank axle. A pedal 20 is coupled to each of the crank arms 12B. The crank 12 is rotated to drive the rear wheel 14A. The rear wheel 14A is supported by the frame 18. The crank 12 and the rear wheel 14A are linked by a drive mechanism 22. The drive mechanism 22 includes a first rotational body 24 coupled to the input rotary body 12A. The input rotary body 12A and the first rotational body 24 can be coupled to rotate integrally with each other. Alternatively, the input rotary body 12A and the first rotational body 24 can be coupled to each other by a first one-way clutch. The first one-way clutch is configured to rotate the first rotational body 24 forward in a case where the crank 12 is rotated forward and permit relative rotation of the crank 12 and the first rotational body 24 in a case where the crank 12 is rotated backward. The first rotational body 24 can include a pulley or a bevel gear. The drive mechanism 22 further includes a second rotational body 26 and a linking member 28. The linking member 28 transmits the rotational force of the first rotational body 24 to the second rotational body 26. The linking member 28 includes, for example, a chain, a belt, or a shaft.

The second rotational body 26 is coupled to the rear wheel 14A. The second rotational body 26 can include a pulley or a bevel gear. Preferably, a second one-way clutch is provided between the second rotational body 26 and the rear wheel 14A. The second one-way clutch is configured to rotate the rear wheel 14A forward in a case where the second rotational body 26 is rotated forward and permit relative rotation of the second rotational body 26 and the rear wheel 14A in a case where the second rotational body 26 is rotated backward.

The front wheel 14B is attached to the frame 18 by a front fork 30. A handlebar 34 is coupled to the front fork 30 by a stem 32. In the present embodiment, the rear wheel 14A is linked to the crank 12 by the drive mechanism 22. However, any one of the rear wheel 14A and the front wheel 14B can be linked to the crank 12 by the drive mechanism 22.

Preferably, the human-powered vehicle 10 further includes a battery 36. The battery 36 includes one or more battery elements. The battery elements include rechargeable batteries. The battery 36 is configured to supply electric power to the human-powered vehicle control device 70. Preferably, the battery 36 is connected to an electronic controller 72 of the human-powered vehicle control device 70 by an electrical cable or a wireless communication device in a manner allowing for communication. The battery 36 is connected by, for example, power line communication (PLC), Controller Area Network (CAN), or Universal Asynchronous Receiver-Transmitter (UART) to the electronic controller 72 in a manner allowing for communication.

The human-powered vehicle 10 includes a motor 38. The motor 38 applies a propulsion force to the human-powered vehicle 10. The motor 38 includes one or more electric motors. The electric motor is, for example, a brushless motor. The motor 38 is configured to transmit rotational force to at least one of the front wheel 14B and a power transmission path of the human driving force H extending from the pedals 20 to the rear wheel 14A. The power transmission path of the human driving force H extending from the pedals 20 to the rear wheel 14A includes the rear wheel 14A. In the present embodiment, the motor 38 is provided on the frame 18 of the human-powered vehicle 10 and configured to transmit rotation to the first rotational body 24. The motor 38 is provided on a housing. The housing is provided on the frame 18. The housing is, for example, attached to the frame 18 in a detachable manner. The motor 38 and a housing of the motor 38 form a drive unit. Preferably, a third one-way clutch is provided in a power transmission path extending between the motor 38 and the input rotary body 12A to limit the rotational force of the crank 12 transmitted to the motor 38 in a case where the input rotary body 12A is rotated in a direction in which the human-powered vehicle 10 moves forward. In a case where the motor 38 is provided on at least one of the rear wheel 14A and the front wheel 14B, the motor 38 can be provided on the hub to form a hub motor with the hub.

Preferably, the controller 72 controls the motor 38 in accordance with an output of at least one of the vehicle speed sensor 42, the crank rotation sensor 48, and the human driving force detector 50.

The human-powered vehicle operation system 60 includes the human-powered vehicle control device 70 and an operation unit 62. The operation unit 62 is provided on, for example, the handlebar 34. Preferably, the operation unit 62 includes a first operating portion 62A and a second operating portion 62B. The operation unit 62 can also be referred to as a user operable input device and the first operating portion 62A and a second operating portion 62B can also be referred to as user operable inputs. The first operating portion 62A and a second operating portion 62B (i.e., the user operable inputs) can include, for example, a button, a switch, a lever, a dial and/or a touch screen.

The human-powered vehicle control device 70 includes the electronic controller 72 configured to control the motor 38 to apply a propulsion force to the human-powered vehicle 10. The term "electronic controller" as used herein refers to hardware that executes a software program, and does not include a human. Hereinafter, the electronic controller 72 will be referred to as "the controller 72" for the sake of brevity. The controller 72 is configured to control the motor 38 in accordance with the human driving force H input to the input rotary body 12A of the human-powered vehicle 10. Further, the controller 72 controls the motor 38 in at least one of a first control state and a second control state. The first control state includes a plurality of assist stages switchable by the operation unit 62 that differs from the input rotary body 12A. For example, the plurality of assist includes a low power assist mode, a normal assist mode, and a high power assist mode. In the second control state, the controller 72 controls the motor 38 in accordance with operation of the operation unit 62. In a case where human driving force H is input to the input rotary body 12A in the second control state, the electronic controller 72 controls the motor 38 in the first control state. The first control state is a control state in which the motor 38 is drivable to assist in propulsion of the human-powered vehicle 10 in a case where, for example, a rider rotates the input rotary body 12A of the human-powered vehicle 10 to drive the human-powered vehicle 10. The second control state is a control state in which the motor 38 is drivable to assist in propulsion of the human-powered vehicle 10 regardless of the depression force applied to the input rotary body 12A in a case where the rider is walking and pushing the human-powered vehicle 10.

The human-powered vehicle control device 70 includes the electronic controller 72. The term "electronic controller" or "controller" as used herein refers to hardware that executes a software program, and does not include a human. Hereinafter, the electronic controller 72 will be referred to as "the controller 72" for the sake of brevity. The controller 72 includes at least one processor 72A that executes a predetermined control program. The processor 72A includes, for example, a central processing unit (CPU) or a micro-processing unit (MPU). When the controller 72 has more than one processor 72A, the processors can be provided at the same location (e.g., a single circuit board) or at a plurality of separate positions. Thus, the controller 72 can include one or more microcomputers. Preferably, the human-powered vehicle control device 70 further includes a storage 74, which is also called a data storage device or a computer storage device. The storage 74 stores information used for various control programs and various control processes. The storage 74 can be any a non-transitory computer readable medium. The storage 74 includes, for example, a nonvolatile memory and a volatile memory. The nonvolatile memory includes, for example, at least one of a read-only memory (ROM), an erasable programmable read-only memory (EPROM), an electrically erasable programmable read-only memory (EEPROM), and a flash memory. The nonvolatile memory includes, for example, a random access memory (RAM).

Preferably, the human-powered vehicle control device 70 further includes a drive circuit 76 of the motor 38. Preferably, the drive circuit 76 and the controller 72 are provided on the housing of the drive unit. The drive circuit 76 and the controller 72 can be provided on, for example, the same circuit substrate. The drive circuit 76 includes an inverter circuit. The drive circuit 76 controls the electric power supplied from the battery 36 to the motor 38. The drive circuit 76 is connected to the controller 72 by a conductive wire, an electric cable, or a wireless communication device. The drive circuit 76 drives the motor 38 in accordance with a control signal from the controller 72.

The human-powered vehicle 10 includes at least one sensor 40 configured to detect information related to the traveling state of the human-powered vehicle 10. The term "sensor" as used herein also refers to a hardware device or instrument designed to detect the presence of a particular object or substance and to emit a signal in response. The term "sensor" as used herein also do not include a human. The controller 72 controls the motor 38 in accordance with the detection result of the sensor 40. Preferably, the sensor 40 includes at least one of the vehicle speed sensor 42, a position information detection sensor 44, and an acceleration sensor 46. The vehicle speed sensor 42 is configured to detect information related to the rotation speed of a wheel 14 of the human-powered vehicle 10. The position information detection sensor 44 is configured to detect information related to the position of the human-powered vehicle 10. The acceleration sensor 46 is configured to detect information related to the acceleration of the human-powered vehicle 10. Preferably, the human-powered vehicle 10 includes at least one of the vehicle speed sensor 42 and the crank rotation sensor 48. The vehicle speed sensor 42 is configured to detect information related to the rotation speed of a wheel 14 of the human-powered vehicle 10. The crank rotation sensor 48 is configured to detect information related to detect information related to the rotation speed of the crank 12. The controller 72 obtains the traveling speed V from the output of the vehicle speed sensor 42 and obtains the rotation speed of the crank 12 from the output of the crank rotation sensor 48.

The vehicle speed sensor 42 is configured to detect information related to the traveling speed V of the human-powered vehicle 10. In the present embodiment, the vehicle speed sensor 42 is configured to detect information related to the rotation speed W of the wheel 14 of the human-powered vehicle 10. The vehicle speed sensor 42 is configured to detect, for example, a magnet provided on the wheel 14 of the human-powered vehicle 10. The vehicle speed sensor 42 is configured to output, for example, a predetermined number of detection signals during a single rotation of the wheel 14. The predetermined number is, for example, one. The vehicle speed sensor 42 outputs a signal corresponding to the rotation speed W of the wheel 14. The controller 72 can calculate the traveling speed V of the human-powered vehicle 10 from the rotation speed W of the wheel 14 and information related to the circumferential length of the wheel 14. The storage 74 stores information related to the circumferential length of the wheel 14. The vehicle speed sensor 42 includes, for example, a magnetic reed, which forms a reed switch, or a Hall element. The vehicle speed sensor 42 can be attached to a chain stay of the frame 18 of the human-powered vehicle 10 and configured to detect a magnet attached to the rear wheel 14A. Alternatively, the vehicle speed sensor 42 can be provided on the front fork 30 and configured to detect a magnet attached to the front wheel 14B. In the present embodiment, the vehicle speed sensor 42 is configured so that a reed switch detects a magnet once whenever the wheel 14 rotates once. The vehicle speed sensor 42 is not limited to a structure that detects a magnet provided on the wheel 14 as long as information related to the traveling speed V of the human-powered vehicle 10 can be obtained. For example, the vehicle speed sensor 42 can be configured to detect a slit provided on a disc brake. Alternatively, the vehicle speed sensor 42 can include an optical sensor or a Global Positioning System (GPS) receiver. The vehicle speed sensor 42 is connected to the controller 72 by a wireless communication device or an electric cable.

The position information detection sensor 44 includes, for example, a Global Positioning System (GPS) receiver. The controller 72 obtains position information of the human-powered vehicle 10 from the GPS information obtained by the GPS receiver and map information stored in advance in the storage 74.

The acceleration sensor 46 detects the acceleration of the human-powered vehicle 10. The acceleration sensor 46 is configured to detect a signal corresponding to acceleration in the direction in which the human-powered vehicle 10 moves forward. The acceleration sensor 46 is connected to the controller 72 by a wireless communication device or an electric cable. The acceleration sensor 46 can include the vehicle speed sensor 42. In a case where the acceleration sensor 46 includes the vehicle speed sensor 42, the traveling speed V is differentiated to obtain the acceleration in the direction in which the human-powered vehicle 10 moves forward.

The crank rotation sensor 48 is configured to detect information related to the rotation speed NC of the crank 12. The crank rotation sensor 48 is provided on, for example, the frame 18 of the human-powered vehicle 10 or the housing of the drive unit. The crank rotation sensor 48 includes a magnetic sensor that outputs a signal corresponding to the magnetic field intensity. An annular magnet of which the magnetic field intensity varies in the circumferential direction is provided on the input rotary body 12A, a member rotated in cooperation with the input rotary body 12A, or in a power transmission path extending from the input rotary body 12A to the first rotational body 24. The member rotated in cooperation with the input rotary body 12A can include an output shaft of the motor 38. The crank rotation sensor 48 outputs a signal corresponding to the rotation speed NC of the crank 12. The magnet can be provided on a member rotated integrally with the input rotary body 12A in a power transmission path of the human driving force H extending from the input rotary body 12A to the first rotational body 24. For example, in a case where the first one-way clutch is not provided between the input rotary body 12A and the first rotational body 24, the magnet can be provided on the first rotational body 24. Instead of the magnetic sensor, the crank rotation sensor 48 can include an optical sensor, an acceleration sensor, a gyro sensor, or a torque sensor as long as information related to the rotation speed NC of the crank 12 can be obtained. The crank rotation sensor 48 is connected to the controller 72 by a wireless communication device or an electric cable.

Preferably, the human-powered vehicle 10 includes the human driving force detector 50. The human driving force detector 50 is configured to detect information related to the human driving force H. The human driving force detector 50 includes, for example, a torque senor. The torque sensor is configured to output a signal corresponding to the torque applied to the crank 12 by the human driving force H. Preferably, in a case where, for example, the first one-way clutch is provided in the power transmission path, the torque sensor is provided in the power transmission path at an upstream side of the first one-way clutch. The torque sensor includes a strain sensor, a magnetostrictive sensor, or a pressure sensor. The strain sensor includes a strain gauge. The torque sensor is provided in the power transmission path or in the vicinity of a member included in the power transmission path. The member included in the power transmission path is, for example, the input rotary body 12A, a member that transmits the human driving force H between the input rotary body 12A and the first rotational body 24, the crank arms 12B, or the pedals 20. The torque sensor is connected to the controller 72 by a wireless communication device or an electric cable. The human driving force detector 50 can include, for example, a sensor that detects the pressure applied to the pedals 20 or a sensor that detects the tension of the chain as long as information related to the human driving force H can be obtained.

In the first control state, the controller 72 controls the motor 38 in a plurality of control modes. The control modes include, for example, a first motor control mode, a second motor control mode, a third motor control mode, and a fourth motor control mode. The first motor control mode, the second motor control mode, and the third motor control mode differ in at least one of assist ratio and upper limit torque. The plurality of control modes are the same as the plurality of assist mentioned above. Thus, for example, the motor control mode, the second motor control mode, and the third motor control mode corresponds to the low power assist mode, the normal assist mode, and the high power assist mode, respectively, of the plurality of assist stages. The assist ratio is, for example, the ratio of the output of the motor 38 to the human driving force H. The fourth motor control mode is a mode that stops the output of the motor 38. At least one of the first motor control mode, the second motor control mode, the third motor control mode, and the fourth motor control mode can be omitted from the plurality of control modes. The plurality of control modes can further include an additional motor control that differs from the first motor control mode, the second motor control mode, the third motor control mode, and the fourth motor control mode.

The controller 72 can be configured to control the motor 38 in accordance with the rotation speed of the crank 12 in addition to the human driving force H in the first control state. For example, in a case where the rotation speed the crank 12 is less than a predetermined speed, the controller 72 stops driving the motor 38 in accordance with at least one of the rotation speed NC of the crank 12 and the human driving force H. The predetermined rotation speed is a speed in the range of 0 rpm to 5 rpm. For example, the controller 72 can control the motor 38 so as to stop the motor 38 or decrease the assist force in a case where the rotation speed NC of the crank 12 becomes greater than or equal to a predetermined rotation speed NCY. For example, the controller 72 stops the motor 38 in a case where the traveling speed V becomes greater than or equal to a first traveling speed VX. The first traveling speed VX is, for example, 25 kilometers per hour. The first traveling speed VX can be less than 25 kilometers per hour, for example, 24 kilometers per hour. The first traveling speed VX can be greater than 25 kilometers per hour, for example, 45 kilometers per hour.

The controller 72 performs switching of the first motor control mode, the second motor control mode, and the third motor control mode in the first control state in accordance with operation of the operation unit 62. For example, in a case where the first operating portion 62A is operated, the controller 72 switches from the assist ratio or upper limit torque of the selected control mode to a control mode of which the assist ratio or upper limit torque is one level larger. In a case where the first operating portion 62A is operated in a state in which the fourth motor control mode is selected, the controller 72 switches to the control mode of which the assist ratio and the upper limit torque are the smallest. For example, in a case where the second operating portion 62B is operated, the controller 72 switches from the assist ratio or upper limit torque of the selected control mode to a control mode of which the assist ratio or upper limit torque is one level smaller. In a case where the second operating portion 62B is operated in a state in which the control mode having the smallest assist ratio or upper limit torque is selected, the controller 72 switches to the fourth control mode.

The second control state includes a control state in which the motor 38 applies a propulsion force to the human-powered vehicle 10 regardless of the human driving force H input to the input rotary body 12A. Preferably, the controller 72 does not drive the motor 38 during a period in which the operation unit 62 is not operated in the second control state and drives the motor 38 during a period in which the operation unit 62 is continuously operated in the second control state. Preferably, the controller 72 does not drive the motor 38 during a period in which the second operating portion 62B is not operated in the second control state and drives the motor 38 during a period in which the second operating portion 62B is continuously operated in the second control state.

Preferably, the controller 72 performs switching of the first control state and the second control state in accordance with operation of the operation unit 62. Preferably, the first control state includes the fourth motor control mode that stops the motor 38, and the controller 72 switches from the first control state to the second control state in accordance with operation of the operation unit 62 in the fourth motor control mode.

Preferably, the controller 72 determines in the second control state that the human driving force H is being input to the input rotary body 12A in a case where the traveling speed V of the human-powered vehicle 10 is greater than or equal to the predetermined traveling speed V1 and the input rotary body 12A is rotating. For example, the controller 72 switches from the second control state to the first control state in a case where the traveling speed V of the human-powered vehicle 10 becomes higher than or equal to the predetermined traveling speed V1. For example, the controller 72 switches from the second control state to the first control state in a case where the input rotary body 12A is rotated. In a case where the traveling speed V of the human-powered vehicle 10 becomes greater than the predetermined traveling speed V1 in the second control state, the controller 72 controls the motor 38 in the first control state. In a case where the controller 72 switches from the second control state to the first control state, the controller 72 can switch to the control mode having the assist ratio or upper limit torque that is the smallest or switch to the fourth motor control mode. In a case where the controller 72 switches from the second control state to the first control state, the controller 72 can switch to a predetermined control mode. The predetermined control mode can be stored in the storage 74 during manufacturing of the human-powered vehicle control device 70 and be configured to be changed by a user.

Figure 3:
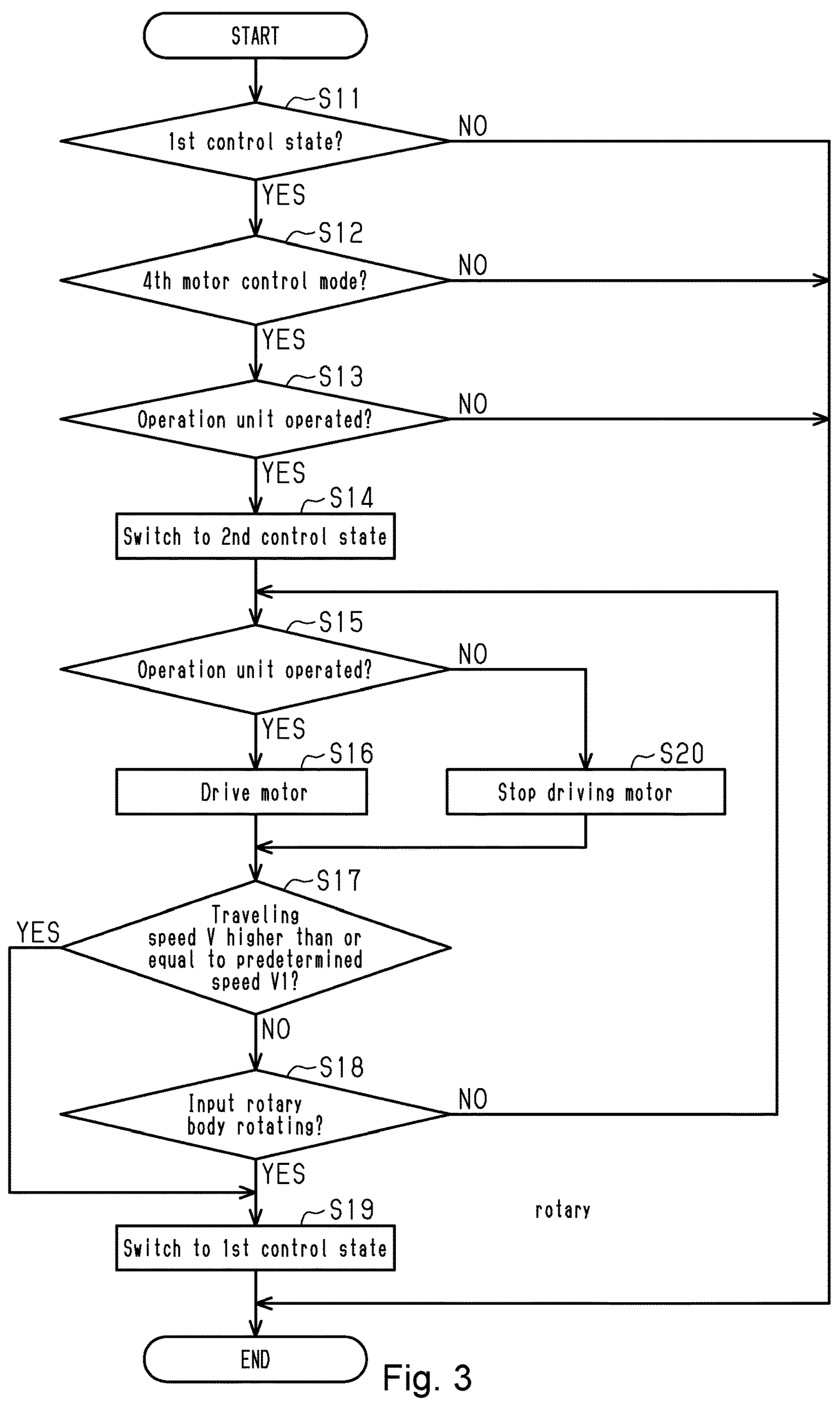
FIG. 3 is a flowchart of a process executed by the human-powered vehicle control device of FIG. 2 to switch between a first control state and a second control state.

With reference to FIG. 3, a process for changing the control state of the motor 38 will now be described. In a case where the controller 72 is supplied with electric power, the controller 72 starts the process and proceeds to step S11 of the flowchart illustrated in FIG. 3. Upon completion of the flowchart illustrated in FIG. 3, the controller 72 repeats the process from step S11 in predetermined cycles until the supply of electric power is stopped.

In step S11, the controller 72 determines whether the control state is the first control state. In a case where the control state is not the first control state, the controller 72 ends the process. In a case where the control state is the first control state, the controller 72 proceeds to step S12.

In step S12, the controller 72 determines whether the control mode is the fourth motor control mode. In a case where the control mode is not the fourth motor control mode, the controller 72 ends the process. In a case where the control mode is the fourth motor control mode, the controller 72 proceeds to step S13.

In step S13, the controller 72 determines whether the operation unit 62 has been operated. For example, the controller 72 determines that the operation unit 62 has been operated in a case where the second operating portion 62B has been operated. In a case where the operation unit 62 has not been operated, the controller 72 ends the process. In a case where the operation unit 62 has been operated, the controller 72 proceeds to step S14.

In step S14, the controller 72 switches to the second control state and then proceeds to step S15. In step S15, the controller 72 determines whether the operation unit 62 has been operated. For example, the controller 72 determines that the operation unit 62 has been operated in a case where the second operating portion 62B has been operated. In a case where the operation unit 62 has been operated, the controller 72 proceeds to step S16. In a case where the operation unit 62 has not been operated in step S15, the controller 72 proceeds to step S20.

In step S16, the controller 72 drives the motor 38 and proceeds to step S17. In step S20, the controller 72 stops driving the motor 38 and proceeds to step S17.

In step S17, the controller 72 determines whether the traveling speed V is higher than or equal to the predetermined speed V1. In a case where the traveling speed V is greater than or equal to the predetermined speed V1, the controller 72 proceeds to step S19. In a case where the traveling speed V is not greater than or equal to the predetermined speed V1, the controller 72 proceeds to step S18.

In step S18, the controller 72 determines whether the input rotary body 12A is rotating. In a case where the input rotary body 12A is not rotating, the controller 72 proceeds to step S15. In a case where the input rotary body 12A is rotating, the controller 72 proceeds to step S19. Thus, in the second control state, in a case where the traveling speed V is less than the predetermined speed V1 and the input rotary body 12A is not rotating, the controller 72 continuously drives the motor 38 as long as the operation unit 62 has been operated.

In step S19, the controller 72 switches to the first control state and then ends the process. Preferably, the controller 72 selects the fourth motor control mode in a case where the controller 72 switches to the first control state. Preferably, the controller 72 stops driving the motor 38 in a case where the controller 72 switches to the first control state.

In a case where the human driving force H is input to the input rotary body 12A in the second control state, the controller 72 will control the motor 38 in the first control state even if the rider does not operate the operation unit 62. This improves the usability.

Second Embodiment

The human-powered vehicle control device 70 for a human-powered vehicle in accordance with a second embodiment will now be described with reference to FIGS. 2 and 4. Same reference numerals are given to those components that are the same as the corresponding components of the first embodiment. Such components will not be described in detail.

The human-powered vehicle control device 70 includes the controller 72 configured to control the motor 38 to apply a propulsion force to the human-powered vehicle 10. The controller 72 controls the motor 38 in at least one of the first control state, in which the controller 72 controls the motor 38 in accordance with the human driving force input to the input rotary body 12A of the human-powered vehicle 10, and the second control state, in which the controller 72 controls the motor 38 in accordance with operation of the operation unit 62 differing from the input rotary body 12A regardless of the human driving force H input to the input rotary body 12A. In a case where a predetermined condition is satisfied in the first control state, the controller 72 controls the motor 38 in the second control state. The predetermined condition includes at least one of a case where a still state in which the human-powered vehicle 10 is still continues over a first predetermined period T1, a case where the traveling speed V of the human-powered vehicle 10 is lower than or equal to the predetermined speed V1, a case where a second predetermined period T2 elapses from a time point at which the human driving force H of a predetermined value H1 or greater is detected in a state in which the human-powered vehicle 10 is traveling at the predetermined speed V1 or lower, a case where a pitch angle D of the human-powered vehicle 10 is greater than or equal to a predetermined pitch angle D1, a case where the human driving force H input to the input rotary body 12A of the human-powered vehicle 10 is greater than or equal to the predetermined value H1, and a case where at least one of the pitch angle D of the human-powered vehicle 10 being greater than or equal to the predetermined pitch angle D1 and the human driving force H input to the input rotary body 12A of the human-powered vehicle 10 being less than or equal to the predetermined value H1 is satisfied in a state in which the human-powered vehicle 10 is traveling at the predetermined speed V1 or lower.

In a case where the predetermined condition is satisfied in the first control state, the controller 72 switches from the first control state to the second control state. The controller 72 can execute any one of the controls in the first to seventh examples, which will be described later, or execute a combination of these controls. In a case where a combination of several controls described in the first to seventh examples are executed in the first control, the controller 72 can switch from the first control state to the second control state if only one of the predetermined condition corresponding to each of the combined examples is satisfied. Further, when executing a combination of several controls of the first to seventh examples, the controller 72 can switch from the first control state to the second control state in a case where the predetermined condition corresponding to each of the combined examples are all satisfied.

In the first example, in a case where a still state in which the human-powered vehicle 10 is still continues over the first predetermined period T1 in the first control state, the controller 72 controls the motor 38 in the second control state. The first predetermined period T1 is, for example, longer than or equal to 3 seconds and shorter than or equal to 60 seconds. Preferably, the first predetermined period T1 is longer than or equal to 5 seconds and shorter than or equal to 45 seconds. Further preferably, the first predetermined period T1 is longer than or equal to 5 seconds and shorter than or equal to 30 seconds.

In the second example, in a case where the traveling speed V of the human-powered vehicle 10 is lower than or equal to the predetermined speed V1 in the first control state, the controller 72 controls the motor 38 in the second control state. The predetermined speed V1 is, for example, higher than or equal to 2 km/h and lower than or equal to 6 km/h. Preferably, the predetermined speed V1 is higher than or equal to 2 km/h and lower than or equal to 5 km/h.

In the third example, in a case where the second predetermined period T2 elapses from a time point at which the human driving force H of the predetermined value H1 or greater is detected in the first control state in a state in which the human-powered vehicle 10 is traveling at the predetermined speed V1 or lower, the controller 72 controls the motor 38 in the second control state. In a case where the human driving force H is torque, the predetermined value H1 is, for example, greater than or equal to 1 Nm and less than or equal to 3 Nm. In a case where the human driving force H is power, the predetermined value H1 is, for example, greater than or equal to 5 watt and less than or equal to 24 watt. The second predetermined period T2 is, for example, longer than or equal to 3 seconds and shorter than or equal to 60 seconds. Preferably, the second predetermined period T2 is longer than or equal to 5 seconds and shorter than or equal to 45 seconds. Further preferably, the second predetermined period T2 is longer than or equal to 5 seconds and shorter than or equal to 30 seconds.

In the fourth example, in a case where the pitch angle D of the human-powered vehicle 10 is greater than or equal to the predetermined pitch angle D1 in the first control state, the controller 72 controls the motor 38 in the second control state. The predetermined pitch angle D1 is, for example, a pitch angle D corresponding to a road gradient of 10% or greater. Preferably, the predetermined pitch angle D1 is a pitch angle D corresponding to a road gradient of 20% or greater. Further preferably, the predetermined pitch angle D1 is a pitch angle D corresponding to a road gradient of 30% or greater. Further preferably, the predetermined pitch angle D1 is a pitch angle D corresponding to a road gradient of 40% or greater. Further preferably, the predetermined pitch angle D1 is a pitch angle D corresponding to a road gradient of 50% or greater.

In the fifth example, in a case where the human driving force H input to the input rotary body 12A of the human-powered vehicle 10 is greater than or equal to the predetermined value H1 in the first control state, the controller 72 controls the motor 38 in the second control state.

In the sixth example, in a case where the pitch angle D of the human-powered vehicle 10 is greater than or equal to the predetermined pitch angle D1 in the first control state in a state in which the human-powered vehicle 10 is traveling at the predetermined speed V1 or lower, the controller 72 controls the motor 38 in the second control state.

In the seventh example, in a case where the human driving force H input to the input rotary body 12A of the human-powered vehicle 10 in the first control state is less than or equal to the predetermined value H1 in a state in which the human-powered vehicle 10 is traveling at the predetermined speed V1 or lower, the controller 72 controls the motor 38 in the second control state.

Preferably, in a case where the controller 72 executes the fourth example and the sixth example, the human-powered vehicle 10 includes an inclination detector 52. The inclination detector 52 is configured to detect the pitch angle D of the human-powered vehicle 10. In one example, the inclination detector 52 includes an inclination sensor. The inclination sensor includes at least one of a gyro sensor and an acceleration sensor. In another example, the inclination detector 52 includes a GPS receiver. The controller 72 can calculate the pitch angle D of the human-powered vehicle 10 from the GPS information obtained by the GPS receiver and the map information stored in advance in the storage 74. The inclination detector 52 is connected to the controller 72 by a wireless communication device or an electric cable.

Preferably, the predetermined condition includes a case where the rotation speed NC of the input rotary body 12A is inconstant. For example, in a case where at least one of the first to seventh examples is satisfied and the rotation speed NC of the input rotary body 12A is inconstant in the first control state, the controller 72 controls the motor 38 in the second control state. For example, in a case where the rotation speed NC of the input rotary body 12A repeatedly becomes 0 and higher than 0 or in a case where the rotation speed NC of the input rotary body 12A repeatedly becomes positive and negative, the controller 72 determines that the rotation speed NC of the input rotary body 12A is inconstant.

Figure 4:
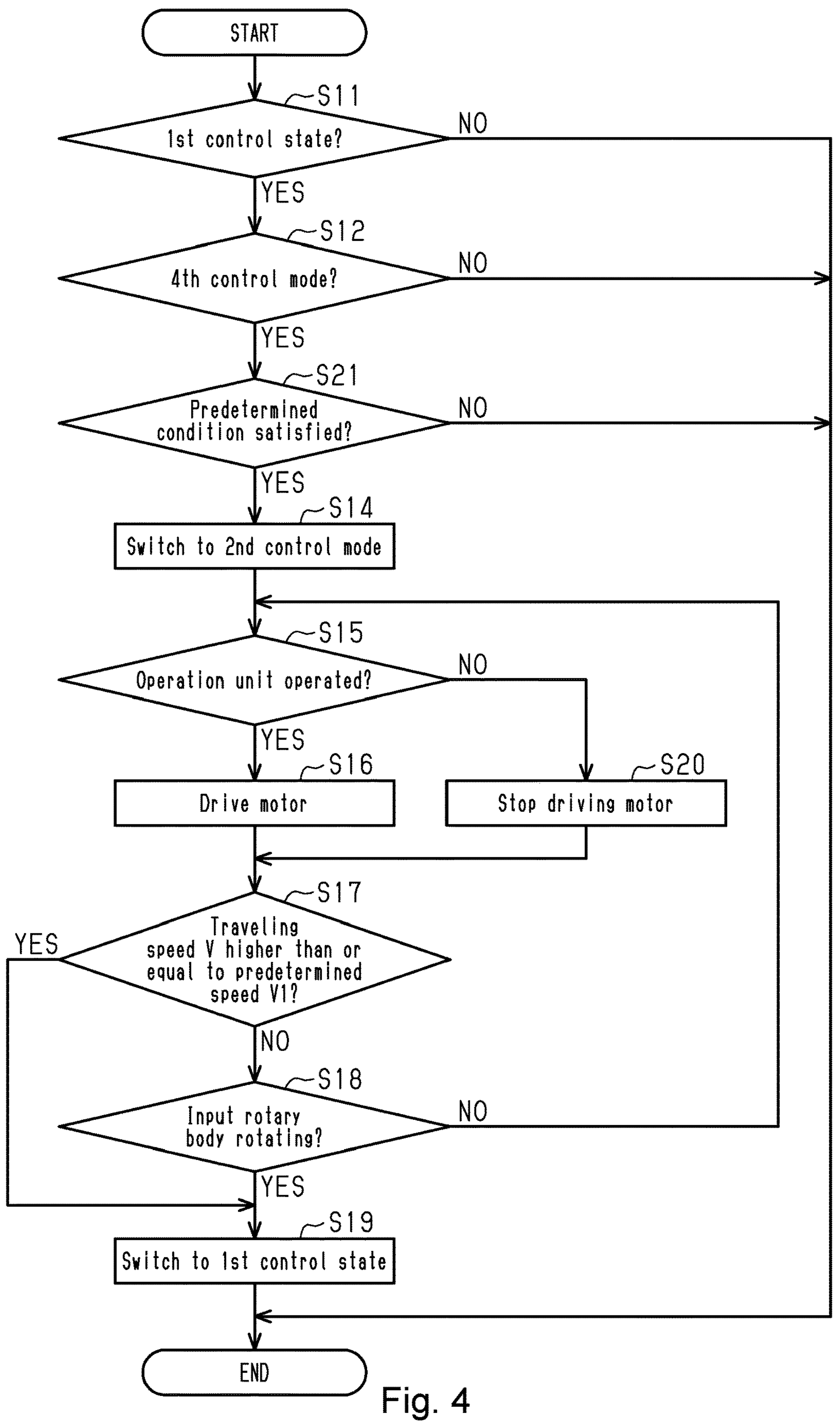
FIG. 4 is a flowchart of a process executed by a human-powered vehicle control device in accordance with a second embodiment to switch between the first control state and the second control state.

With reference to FIG. 4, a process for switching the control state of the motor 38 will now be described. The process illustrated in FIG. 4 differs from the process illustrated in FIG. 3 only in that step S13 is replaced by step S21. In FIG. 4, in a case where an affirmative determination is given in step S12, the controller 72 proceeds to step S21.

In step S21, the controller 72 determines whether the predetermined condition is satisfied. In a case where the predetermined condition is not satisfied, the controller 72 ends the process. In a case where the predetermined condition is satisfied, the controller 72 proceeds to step S14.

In a state in which the predetermined condition is satisfied, the probability of the rider walking and pushing the human-powered vehicle 10 is high. For example, the predetermined condition is easily satisfied in a case where the human-powered vehicle 10 is traveling uphill where the load on the rider is large or in a case where the human-powered vehicle 10 is successively moving over obstacles. The controller 72 switches to the second control state in a case where the predetermined condition is satisfied. This smoothly assists the rider who is walking and pushing the human-powered vehicle 10.

Modifications

The description related to the above embodiments exemplifies, without any intention to limit, applicable forms of a control device for a human-powered vehicle and an operation system for a human-powered vehicle according to the present disclosure. The human-powered vehicle control device for a human-powered vehicle and the operation system for a human-powered vehicle according to the present disclosure are applicable to, for example, modifications of the above embodiments that are described below and combinations of at least two of the modifications that do not contradict each other. In the modifications described hereinafter, same reference numerals are given to those components that are the same as the corresponding components of the above embodiment. Such components will not be described in detail.

In the second control state, in a case where the rider operates the operation unit 62, the controller 72 can control the motor 38 in the first control state.

The human-powered vehicle control device 70 for a human-powered vehicle can include the controller 72 that controls the motor 38, which applies a propulsion force to the human-powered vehicle 10. The controller 72 controls the motor 38 in at least one of the first control state, in which the controller 72 controls the motor 38 in accordance with the human driving force H input to the input rotary body 12A of the human-powered vehicle 10, and the second control state, in which the controller 72 controls the motor 38 in accordance with operation of the operation unit 62 differing from the input rotary body 12A regardless of the human driving force H input to the input rotary body 12A. In a case where the traveling speed V of the human-powered vehicle 10 becomes higher than or equal to the predetermined traveling speed V1 in the second control state, the controller 72 can control the motor 38 in the first control state. In this case, for example, step S18 of FIG. 3 can be omitted from the first embodiment.

Figure 5:
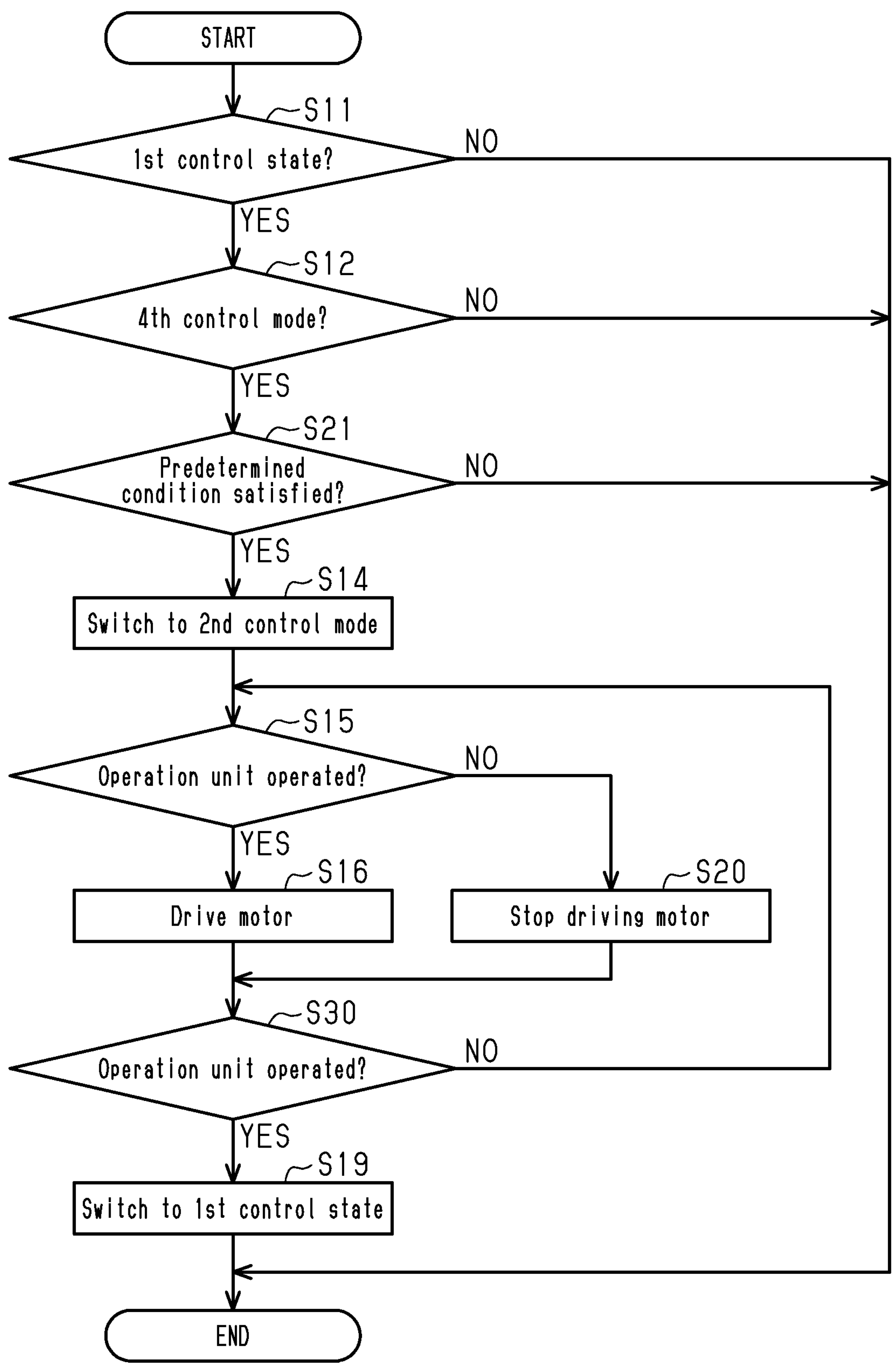
FIG. 5 is a flowchart of a process executed by a human-powered vehicle control device in accordance with a modification of the second embodiment to switch between the first control state and the second control state.

In the second embodiment, in a case where the rider operates the operation unit 62 in the second control state, the controller 72 can control the motor 38 in the first control state. In this case, for example, instead of steps S17 and S18 of FIG. 4, the controller 72 performs step S30 illustrated in FIG. 5. In the process illustrated in FIG. 5, the controller 72 performs step S16 and then proceeds to step S30. In the process illustrated in FIG. 5, the controller 72 performs step S20 and then proceeds to step S30. In step S30, the controller 72 determines whether the operation unit 62 has been operated. In a case where the operation unit 62 has been operated, the controller 72 proceeds to step S19. In a case where the operation unit 62 has not been operated, the controller 72 proceeds to step S15. Preferably, in a case where the controller 72 determines whether the operation unit 62 has been operated instead of performing steps S17 and S18 of FIG. 4, the controller 72 determines that the operation unit 62 has been operated in a case where the first operating portion 62A has been operated.

In each of the embodiments, the operation unit 62 can include a third operating portion that switches control modes in the first control state and a fourth operating portion that switches from the first control state to the second control state. In this case, for example, in step 13 of FIG. 3, operation of the operation unit 62 is determined in a case where the fourth operating portion is operated.

In a case where a control mode other than the fourth motor control mode is selected in the first control state, the controller 72 can switch to the second control state. For example, the operation unit 62 includes a fifth operating portion that switches from the first control state to the second control state. In a structure including the fifth operating portion, in a case where the controller 72 is switched from the second control state to the first control state, the controller 72 can switch to the motor control mode that was selected before switching to the second control state.

In this specification, the phrase "at least one of" as used in this disclosure means "one or more" of a desired choice. As one example, the phrase "at least one of" as used in this disclosure means "only one choice" or "both of two choices" in a case where the number of choices is two. In another example, the phrase "at least one of" as used in this disclosure means "only one single choice" or "any combination of two or more choices" if the number of its choices is three or more.

What is claimed is:

1. A human-powered vehicle control device for a human-powered vehicle, the human-powered vehicle control device comprising:

a controller configured to control a motor to apply a propulsion force to the human-powered vehicle, the controller being configured to control the motor in at least one of a first control state and a second control state, the first control state being one in which the controller controls the motor in accordance with a human driving force input to an input rotary body of the human-powered vehicle, the first control state including a plurality of assist stages switchable by an operation unit differing from the input rotary body, the plurality of assist stages each differing in at least one of assist ratio and upper limit torque, the second control state being one in which; the motor is drivable to assist in propulsion of the human-powered vehicle, the controller controls the motor in accordance with an operation of the operation unit in a case of walking, and the motor applies the propulsion force to the human-powered vehicle regardless of the human driving force input to the input rotary body, and the controller being configured to switch from the second control state to the first control state in a case where human driving force is input to the input rotary body and a traveling speed of the human-powered vehicle becomes higher than a predetermined traveling speed that is determined in advance and being configured to switch from the first control state to the second control state when the operation unit is operated.

2. The human-powered vehicle control device according to claim 1, wherein the controller is configured to switch from the second control state to the first control state in a case where the input rotary body is rotated.

3. The control device according to claim 1, wherein the controller is configured to perform switching of a first motor control mode, a second motor control mode, and a third motor control mode in the first control state in accordance with the operation of the operation unit.

4. The human-powered vehicle control device according to claim 3, wherein the controller is configured to perform switching of the first control state and the second control state in accordance with the operation of the operation unit.

5. The human-powered vehicle control device according to claim 3, wherein the first control state includes a fourth motor control mode that stops the motor, and the controller is configured to switch from the first control state to the second control state in accordance with the operation of the operation unit while in the fourth control mode.

6. The human-powered vehicle control device according to claim 1, wherein the controller is configured not to drive the motor during a period in which the operation unit is not operated in the second control state, and the controller is configured to drive the motor during a period in which the operation unit is continuously operated in the second control state.

7. A human-powered vehicle operation system comprising the human-powered vehicle control device according to claim 1; and further comprising the operation unit.

8. A human-powered vehicle control device for a human-powered vehicle, the human-powered vehicle control device comprising:

a controller configured to control a motor to apply a propulsion force to the human-powered vehicle; and a sensor configured to detect information related to a traveling state of the human-powered vehicle, the sensor including at least one of a vehicle speed sensor configured to detect information related to a rotational speed of a wheel of the human-powered vehicle, a position information detection sensor configured to detect information related to a position of the human-powered vehicle, and an acceleration sensor configured to detect information related to acceleration of the human-powered vehicle, the controller being configured to control the motor in a first control state and a second control state and being configured to control the motor in accordance with a detection result of the sensor, the first control state being one in which the controller controls the motor in accordance with human driving force input to an input rotary body of the human-powered vehicle, and the second control state being one in which the controller controls the motor in accordance with an operation of an operation unit differing from the input rotary body regardless of the human driving force input to the input rotary body, the controller being configured to switch from the second control state to the first control state in a case where a traveling speed of the human-powered vehicle becomes higher than a predetermined traveling speed in the second control state.

9. A human-powered vehicle control device for a human-powered vehicle, the human-powered vehicle control device comprising:

a controller configured to control a motor to apply a propulsion force to the human-powered vehicle, the controller being configured to control the motor in a first control state and a second control state, the first control state being one in which the controller controls the motor in accordance with human driving force input to an input rotary body of the human-powered vehicle, the second control state being one in which the motor is drivable to assist in propulsion of the human-powered vehicle and the controller controls the motor in accordance with an operation of an operation unit differing from the input rotary body regardless of the human driving force input to the input rotary body, the controller being configured to switch from the second control state to the first control state in a case where a traveling speed of the human-powered vehicle becomes higher than a predetermined traveling speed in the second control state, and in a case where a predetermined condition is satisfied in the first control state, the controller being configured to switch to the second control state, and the controller being configured to switch from the first control state to the second control state when the operation unit is operated, the predetermined condition including at least one of:

a case where a still state in which the human-powered vehicle is still continues over a first predetermined period, a case where a traveling speed of the human-powered vehicle is lower than or equal to a predetermined speed, a case where a second predetermined period elapses from a time point at which the human driving force of a predetermined value or greater is detected in a state in which the human-powered vehicle is traveling at the predetermined speed or lower, a case where a pitch angle of the human-powered vehicle is greater than or equal to a predetermined pitch angle, a case where the human driving force input to the input rotary body of the human-powered vehicle is greater than or equal to the predetermined value, and a case where the pitch angle of the human-powered vehicle is greater than or equal to the predetermined pitch angle and the human driving force input to the input rotary body of the human-powered vehicle is less than or equal to the predetermined value is satisfied in a state in which the human-powered vehicle is traveling at the predetermined speed or lower.

10. The human-powered vehicle control device according to claim 9, wherein the predetermined condition further includes a case where a rotational speed of the input rotary body is fluctuating.

11. The human-powered vehicle control device according to claim 9, further comprising at least one of a vehicle speed sensor configured to detect information related to a rotational speed of a wheel of the human-powered vehicle and a crank rotation sensor configured to detect information related to a rotational speed of a crank, and the controller being configured to obtain the traveling speed from an output of the vehicle speed sensor and obtains the rotational speed of the crank from an output of the crank rotation sensor.

* * * * *